US005681379A

United States Patent [19]

Talvalkar et al.

[11] Patent Number: 5,681,379

[45] Date of Patent: Oct. 28, 1997

[54] THERMAL TRANSFER RIBBON FORMULATION

[75] Inventors: Shashi G. Talvalkar, Kettering; Marion E. McCreight, West Carrollton; Yaoping Tan, Miamisburg, all of Ohio

[73] Assignee: NCR Corporation, Dayton, Ohio

[21] Appl. No.: 658,421

[22] Filed: Jun. 5, 1996

Related U.S. Application Data

[62] Division of Ser. No. 419,979, Apr. 11, 1995, Pat. No. 5,552,231, which is a continuation of Ser. No. 46,834, Apr. 13, 1993, abandoned.

[51] Int. Cl.[6] .......... C09D 11/12; C09D 5/26; C09D 191/08

[52] U.S. Cl. .......... 106/19 D; 106/19 E; 106/271

[58] Field of Search .......... 106/190, 19 E, 106/271

[56] References Cited

PUBLICATIONS

CA 123:172973, Kobayashi et al, "Thermal transfer printing sheets" Jul. 11, 1995.

CA 113:8196, Ogawa et al, "Ink compositions for thermal transfer sheets and manufacture thereof" Feb. 7, 1990.

CA 110:59675, Tezuka et al, "Pourous ink layer–containing thermal transfer sheets for printer ribbons" Aug. 29, 1988.

*Primary Examiner*—David Brunsman

[57] ABSTRACT

A thermal transfer ribbon has a substrate and a coating which contains thermally active ingredients for transferring images onto a receiving medium upon the application of heat to said ribbon. The ingredients are predominately water based and are environmentally acceptable in the industry. The various ingredients provide a flexible coating structure and a good adhesive bond along with improved resistance to smear and smudging of the transferred images. The thermal transfer formulation comprises carnauba wax and paraffin wax emulsified in a mixture of 1–10% volatile solvent and about 90–99% water.

6 Claims, 1 Drawing Sheet

THERMAL TRANSFER RIBBON FORMULATION

This is a Division of application Ser. No. 08/419,979 now U.S. Pat. No. 5,552,231, filed Apr. 11, 1995 which is a file wrapper continuation application of parent application Ser. No. 08/046,834 filed Apr. 13, 1993 now abandoned.

BACKGROUND OF THE INVENTION

In the printing field, the impact type printer has been the predominant apparatus for providing increased throughput of printed information. The impact printers have included the dot matrix type wherein individual print wires are driven from a home position to a printing position by individual and separate drivers. The impact printers also have included the full character type wherein individual type elements are caused to be driven against a ribbon and paper or like record media adjacent and in contact with a platen.

The typical and well-known arrangement in a printing operation provides for transfer of a portion of the ink from the ribbon to result in a mark or image on the paper. Another arrangement includes the use of carbonless paper wherein the impact from a print wire or a type element causes rupture of encapsulated material for marking the paper. Also known are printing inks which contain magnetic particles wherein certain of the particles are transferred to the record media for encoding characters in manner and fashion so as to be machine readable in a subsequent operation. One of the known encoding systems is MICR (Magnetic Ink Character Recognition) utilizing the manner of operation as just mentioned.

While the impact printing method has dominated the industry, one disadvantage of this type of printing is the noise level which is attained during printing operation. Many efforts have been made to reduce the high noise levels by use of sound absorbing or cushioning materials or by isolating the printing apparatus.

More recently, the advent of thermal printing which effectively and significantly reduces the noise levels has brought about the requirements for heating of extremely precise areas of the record media by use of relatively low energy, thin film resistors or like thermal print head elements. The intense heating of the individually isolated elements causes transfer of coating material from a coated medium onto paper or like receiving substrate. Alternatively, the paper may be of the thermal type which includes materials that are responsive to the generated heat.

The use of thermal transfer printing, especially when performing a subsequent sorting operation, can result in smearing or smudging adjacent the printed symbols or digits on the receiving substrate. This smearing can make character recognition, such as OCR (Optical Character Recognition) or MICR (Magnetic Ink Character Recognition), difficult and sometimes impossible. Additionally, the surface of the receiving substrate and the printed symbols or digits are subject to scratching which can result in blurred images and also result in incorrect reading of the characters. Further, it has been found that certain transfers of coating material from the coated medium to the receiving substrate resulted in ill-defined and non-precise or blurred images.

In the case of previous or prior art formulations used in thermal printing technology and still in use today, solvent or hot melt systems involve the use of temperatures of 150–300 degrees F. The hot melt process uses waxes and resins along with pigments which are formulated at temperatures of 150–300 degrees F. The solvent process uses volatile solvents incorporating waxes, resins and pigments which are formulated at temperatures of 150–170 degrees F. However, there is an environmental problem with disposal of excess materials when using these processes.

Still more recently, the environment has become a controversial issue in the matter of awareness and protection of certain areas, and means are being implemented to protect such areas. One of the means for protecting the environment is reducing the emissions of volatile organic compounds (VOC) in manufacturing processes. In this regard, it is expected that the use of synthetic solvents will be eliminated or substantially reduced within a few years.

In view of these environmental issues and the conditions associated therewith, the present invention has resulted in a thermal transfer medium in the preferred form of a ribbon which eliminates or substantially reduces smearing or smudging and scratching across or adjacent the printed digits or symbols during sorting or other operations, and the ribbon is made of materials that are acceptable by the industry for environmental protection.

Hundreds of formulations and many more compounds were used in water base experimental operations to find an optimum coating for use in thermal printing technology that is environmentally acceptable. The present invention uses water and a small amount of volatile solvent to create a coating that is acceptable, the solvent being included for proper rheological control.

Representative documentation in the area of nonimpact printing includes U.S. Pat. No. 3,663,278, issued to J. H. Blose et al. on May 16, 1972, which discloses a thermal transfer medium having a coating composition of cellulosic polymer, thermoplastic resin, plasticizer and a sensible dye or oxide pigment material.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,343,494, issued to G. H. Ehrhardt et al. on Aug. 10, 1982, discloses a carbonless copy paper with a hot melt coating on one surface and an image receptor coating on the other surface.

U.S. Pat. No. 4,347,282, issued to G. H. Ehrhardt et al. on Aug. 31, 1982, discloses a chemical carbonless copy paper with a hot melt coating.

U.S. Pat. No. 4,403,224, issued to R. C. Wironwski on Sep. 6, 1983, discloses a surface recording layer comprising a resin binder, a pigment and a smudge inhibitor dispersed in the binder.

U.S. Pat. No. 4,463,034, issued to Y. Tokunaga et al. on Jul. 31, 1984, discloses a heat sensitive magnetic transfer element having a hot melt or a solvent coating.

U.S. Pat. No. 4,523,207, issued to M. W. Lewis et al. on Jun. 11, 1985, discloses a thermal record sheet which uses crystal violet lactone and a phenolic resin.

U.S. Pat. No. 4,592,954, issued to S. L. Malhotra on Jun. 3, 1986, discloses a transparency for ink jet printing and having a substrate and a coating consisting essentially of a blend of carboxymethyl cellulose and polyethylene oxides.

U.S. Pat. No. 4,628,000, issued to S. G. Talvalkar et al. on Dec. 9, 1986, discloses a thermal transfer formulation that includes an adhesive-plasticizer or transfer agent and a coloring material or pigment.

U.S. Pat. No. 4,651,177, issued to S. M. Morishita et al. on Mar. 17, 1987, discloses a thermal transfer recording material having a heat-meltable ink layer comprising a dye or pigment, a binder and a wax which are coated on a support as an aqueous solution and/or an aqueous emulsion.

U.S. Pat. No. 4,687,701, issued to F. Knirsch et al. on Aug. 18, 1987, discloses a heat-sensitive inked element using a blend of thermoplastic resins and waxes.

U.S. Pat. No. 4,688,057, issued to S. Ueyama on Aug. 18, 1987, discloses a heat-sensitive transferring recording medium with an ink layer consisting essentially of three waxes of different values, an extender pigment and a coloring agent.

U.S. Pat. No. 4,707,395, issued to S. Ueyama et al. on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet having a hot melt ink layer on one surface of a film and a filling layer laminated on the ink layer.

U.S. Pat. No. 4,792,495, issued to M. Taniguchi et al. on Dec. 20, 1988, discloses a fusible ink sheet having a top layer of carnauba wax, montan wax or paraffin wax and ethylene vinyl acetate copolymer on a color layer.

U.S. Pat. No. 4,882,218, issued to K. Koshizuka et al. on Nov. 21, 1989, discloses a thermal transfer recording medium having two heat softening layers each containing a polyoxyethylated compound.

U.S. Pat. No. 4,956,225, issued to S. L. Malhotra on Sep. 11, 1990, discloses a transparency suitable for imaging and having a polymeric substrate with a toner receptive coating on one surface and which coating is comprised of blends selected from the group consisting of polyethylene oxide, carboxymethyl cellulose and hydroxypropyl cellulose.

U.S. Pat. No. 5,021,291, issued to T. Kobayashi et al. on Jun. 4, 1991, discloses an ink-bearing medium comprising a water-soluble resin containing polyvinyl alcohol, a fusible ink material containing a solid fatty acid, a coloring agent, and a fusible agent.

U.S. Pat. No. 5,045,383, issued to M. Maeda et al. on Sep. 3, 1991, discloses a thermosensitive image transfer recording medium comprising a support, a release layer having an unvulanized rubber and a thermofusible wax component and a thermofusible ink layer having a coloring agent and a thermofusible resin component.

And, U.S. Pat. No. 5,128,308, issued to S. G. Talvalkar on Jul. 7, 1992, discloses a thermal transfer ribbon comprising a substrate, a first coating thereon containing water-based ingredients which are thermally reactive for creating color images, the ingredients being a leuco dye and a phenolic resin, and a second coating containing solvent-based ingredients which are thermally active for transferring the color images.

SUMMARY OF THE INVENTION

The present invention relates to nonimpact printing. More particularly, the invention provides a coating formulation or composition for a thermal ribbon or transfer medium for use in imaging or encoding characters on paper or like record media documents which enable machine, or human, or reflectance reading of the imaged or encoded characters. The thermal transfer ribbon enables printing in a quiet and efficient manner and makes use of the advantages of thermal printing on documents with a signal inducible ink.

Since the transferred digits or symbols, which are created by means of thermal transfer technology, in effect, "sit" on the surface of the paper or media, a smearing of the ink of the digits or symbols or a scratching of the surface of the paper or media is of major concern in the course of the document sorting operation.

In accordance with the present invention, there is provided a thermal transfer ribbon comprising a substrate, and a coating on the substrate and containing essential ingredients which are water based and are thermally active for thermally transferring color images onto an image receiving medium upon application of heat to the coating of the ribbon, the thermally active ingredients comprising a solution of poly(ethylene oxide) resin, casein, high density polyethylene and carnauba wax, the ingredients being solubilized or emulsified in a mixture of about 10 percent volatile solvent and about 90 percent water.

The ribbon comprises a thin, smooth substrate such as tissue-type paper or polyester-type plastic on which is applied a layer or coating that is thermally active for transferring the color images, upon application of heat to the ribbon, onto an image receiving medium. The thermally active ingredients are mixed or dispersed in a solution or emulsion and then the mixture is ground to form extremely fine particles in an attritor or other conventional dispersing equipment. Coloring pigments, dyes or like sensible materials may include carbon black for use in thermal transfer ribbons or may include magnetic sensible materials for use in magnetic thermal transfer ribbons. The thermal transfer coating is then applied to the substrate by well-known or conventional coating techniques.

The coating or layer of the present invention is provided to substantially reduce or eliminate image smearing, smudging or scratching of a transferred and printed image when using a nonmagnetic or a magnetic thermal transfer ribbon. The coating is predominately water based and includes poly(ethylene oxide) resin and casein along with a wax emulsion and pigment or dye material. The coating is formulated at room temperatures in the range from 65 to 80 degrees F.

In view of the above discussion, a principal object of the present invention is to provide a ribbon which includes a thermal-responsive coating.

Another object of the present invention is to provide a thermal transfer ribbon substrate including a coating thereon for use in imaging or encoding operations.

An additional object of the present invention is to provide a coating on a ribbon having ingredients in the coating which are responsive to heat for transferring a portion of the coating to paper or like record media.

A further object of the present invention is to provide a coating on a ribbon substrate, which coating includes a pigment material and a wax emulsion dispersed in a binder mix and which is responsive to heat for transferring the coating in precise printing manner to paper or like record media.

Still another object of the present invention is to provide a thermally-activated coating on a ribbon that is transferred from the ribbon onto the paper or document in an imaging operation in printing manner at precise positions and during the time when the thermal elements of the printer are actuated to produce a well-defined and precise or sharp image.

Still an additional object of the present invention is to provide a thermal transfer layer consisting essentially of a wax emulsion to prevent smearing or scratching of printed images or other marks.

Still a further object of the present invention is to provide a process which includes the preparation of a coating on media for use in a sorting operation.

Still another object of the present invention is to provide a heat sensitive, thermal transfer ribbon created by use of a predominately water-based coating and the transferred images from the coating resist smearing, smudging or scratching of the transferred images or marks.

Still an additional object of the present invention is to provide a thermal transfer ribbon by combining thermally active materials with thermochromic dyes or pigments which upon heating create various or different color images.

Still another object of the present invention is to provide a coating or layer on a substrate to form a thermal transfer ribbon and which is capable of forming a color upon the application of heat by reason of specific ingredients in the coating and also is capable of transferring of color images onto a receiving substrate.

Still a further object of the present invention is to provide a thermal transfer ribbon that includes a coating which is environmentally acceptable by reason of the use of water-based ingredients.

Additional advantages and features of the present invention will become apparent and fully understood from a reading of the following description taken together with the annexed drawing.

DESCRIPTION OF THE PREFERRED EMBODIMENT

Figure 1:
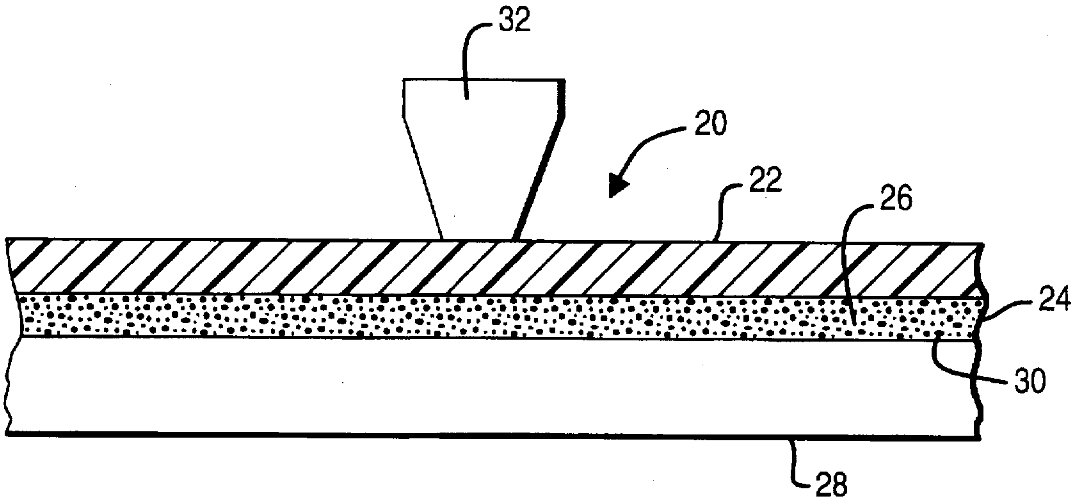
FIG. 1 illustrates a receiving document and a thermal element operating with a ribbon base or substrate having a layer or coating incorporating the ingredients as disclosed in the present invention.
Figure 2:
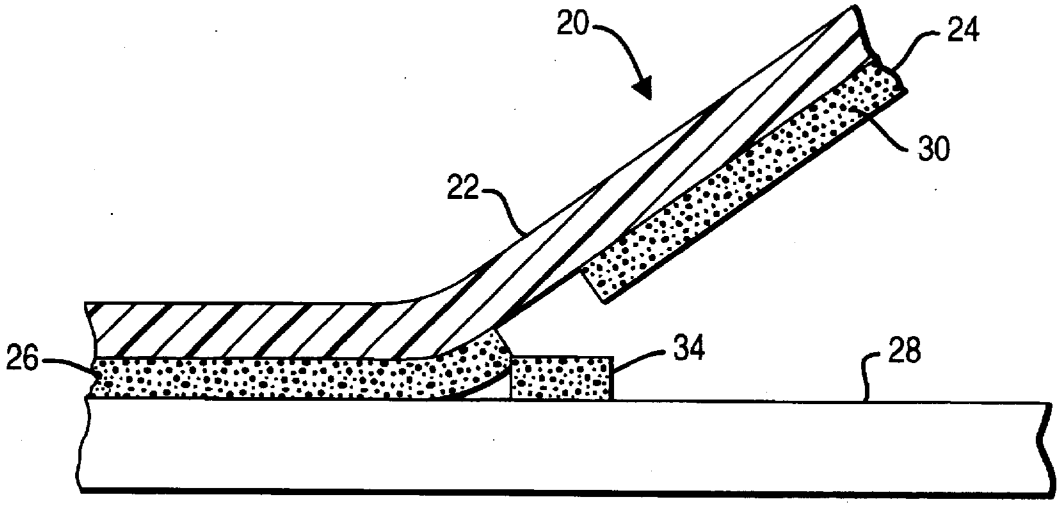
FIG. 2 shows the receiving document with a portion of the coating transferred in the form of a digit, symbol or other mark onto the receiving document.

The transfer ribbon 20, as illustrated in FIGS. 1 and 2, comprises a base or substrate 22 of thin, smooth, tissue-type paper or polyester-type plastic or like material having a coating or layer 24 on the substrate. The coating 24 contains thermally active material 26 in the form of particles thereof combined with pigment or dye particles 30. The coating 24 may be either magnetic, nonmagnetic or fluorescent in nature and comprise certain essential ingredients for use in imaging or encoding operations to enable machine reading, or human reading, or reflectance reading, of characters or other marks. Each character or mark that is imaged on a receiving paper document 28 or like record media produces a unique pattern or image 34 that is recognized and read by the reader. In the case of thermal transfer ribbons relying solely on the nonmagnetic thermal printing concept, the pigment or particles 30 include coloring materials such as pigments or dyes. In the case of ribbons relying on the magnetic thermal printing concept, the pigment or particles 30 include magnetic oxides or like sensible materials.

As alluded to above, it is noted that the use of a thermal printer having a print head element, as 32, substantially reduces noise levels in printing operation and provides reliability in imaging or encoding of paper or like documents 28. The thermal transfer ribbon 20 provides the advantages of thermal printing while encoding or imaging the document 28 with a magnetic or with a nonmagnetic signal inducible ink. When the heating elements 32 of a thermal print head are actuated, the imaging or encoding operation requires that the pigment 30 and other particles of material 26 in the coating 24 on the coated ribbon 20 be transferred from the ribbon to the document 28 in manner and form to produce precisely defined characters 34 on the document for recognition by the reader. In the case of nonmagnetic thermal printing, the imaging or encoding materials 26 and 30 are transferred to the document 28 to produce precisely defined characters 34 for recognition and for machine, human, or reflectance reading thereof.

The coating or layer 24 is provided directly on the substrate 22 and the coating exhibits the following characteristics, namely, the coating must be resistant to normal operational parameters and must not inhibit transfer of the thermal-sensitive materials 26 and 30 at a normal print head energy, and the coating 24 must allow a bond of the thermal-sensitive materials in the coating onto the paper 28 upon transfer of such materials.

A preferred formulation for the coating 24 includes the ingredients in appropriate amounts as set forth in Example I.

EXAMPLE I

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 18.0 | 22.5 | 22.5 | 8–40 |
| Polyox (N-10) | 0.1 | 3.0 | 3.8 | 37.5 | 2–8 |
| Casein (BL-380) | 0.1 | 4.0 | 5.0 | 50.0 | 2–8 |
| HDPE Emulsion (ME-46940) | 0.4 | 15.0 | 18.8 | 46.9 | 1–40 |
| Carnauba Emul (ML-16025) | 0.25 | 60.0 | 75.0 | 300.0 | 15–75 |
| Subtotal | | 100.0 | 125.1 | 456.9 | |
| N-Propanol or IsoPropanol (10%) | | | | 37.5 | 5–15 |
| De-Ionized Water (90%) | | | | 5.6 | Balance |
| Total | | 100.0 | 125.1 | 500.0 | |
| Wet Batch: 500 | | Design Solids: 25.0% | | | 15–35 |

All quantities in the above example are in grams. The figures for the component solids are the non-volatiles or ratios of solids to the total. It is to be noted that the percentage of solids for the 500 gram batch of ingredients in Example I is about 25%.

The coating or layer 24 is applied to the substrate 22 by means of conventional coating techniques such as a Meyer rod or like wire-wound doctor blade set up on a typical coating machine to provide a coating weight of 5.0 to 12.0 milligrams per 4 square inches when using 18 to 22 gauge polyester film.

In the above example, a 10% solution of each of Polyox resin and casein are prepared separately using the deionized water. The Polyox resin and the casein are the two key ingredients in the coating or formulation of Example I. The Polyox resin combined with the high density polyethylene provide a very flexible coating structure and the casein creates a good adhesive bond to the polyester film. The results obtained with the Polyox resin, the casein and the high density polyethylene achieved the desired flexibility and adhesive qualities in view of the fact that it had been found previously that such results were difficult to obtain on plastic substrates with water base coatings when using emulsions of brittle waxes such as Carnauba. The Carnauba emulsion is used to accomplish transfer of the coating material by thermal energy when the coated film is operating in a thermal transfer printer. The high density polyethylene along with the casein improves the smear resistance of the thermally transferred characters or printing such as a bar code on a coated receiver sheet. The carbon black is added to the formulation as a pigment or black colorent for recognition by a bar code reader. A variety of colors are possible when using different pigments.

As alluded to above, the preferred formulation set forth in Example I provides a printed image or character that exhibits good sharpness, contrast and smear resistance on coated receiver stocks. Because of the high smear resistance characteristic of the coating of Example I, transfer of the ribbon material onto uncoated receiver stock is not as good as coated stock.

Another formulation for the coating 24 includes the ingredients and quantities set out in Example II. For applications where smear resistance is of lesser importance but where good print quality is required on both coated stock and uncoated stock, the casein and the high density polyethylene are removed from the formulation of Example I and are replaced with a larger percentage of the carnauba emulsion along with glycerine, as set forth in Example II. The glycerine maintains the flexibility of the coating.

EXAMPLE II

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 18.0 | 22.5 | 22.5 | 12–40 |
| Polyox (N-10) | 0.1 | 3.0 | 3.8 | 37.5 | 2–8 |
| Glycerine (Star) | 1.0 | 4.0 | 5.0 | 5.0 | 2–8 |
| Carnauba Emul (ML-16025) | 0.25 | 75.0 | 93.7 | 375.0 | 15–75 |
| Subtotal | | 100.0 | 125.0 | 440.0 | |
| N-Propanol or IsoPropanol (10%) | | | | 37.5 | 5–15 |
| De-Ionized Water (90%) | | | | 22.5 | Balance |
| Total | | 100.0 | 125.0 | 500.0 | |
| Wet Batch: 500 | | Design Solids: 25.0% | | | 15–35 |

It was found that while the presence of glycerine in the formulation of Example II provided flexibility and good transfer of the coating material onto both coated and uncoated receiver stocks, the coating on the ribbon and the transferred print are "softer" and thus not as resistant to smear. In almost all cases, there is a very good but negative correlation between print quality and smear resistance.

A further formulation for the coating 24 includes the ingredients and quantities as set forth in Example III.

EXAMPLE III

| Component & Commercial Grade | Component Solids (Fraction) | Percent Dry | Batch Dry | Batch Wet | Experimental Range % |
|---|---|---|---|---|---|
| Acrylic Black (KS-1720) | 0.4 | 10.0 | 15.0 | 37.5 | 6–30 |
| Carnauba Emul (ML-16025) | 0.25 | 45.0 | 67.5 | 270.0 | 30-75 |
| Paraffin Emul (ML-74332) | 0.37 | 45.0 | 67.5 | 182.4 | 30-75 |
| Subtotal | | 100.0 | 150.0 | 600.0 | |
| N-Propanol or IsoPropanol (2.2%) | | | 10.0 | | 1–10 |
| De-Ionized Water (97.8%) | | | 100.0 | | Balance |
| Total | | 100.0 | 125.0 | 600.0 | |
| Wet Batch: 600 | | Design Solids: 25.0% | | | 15–35 |

The formulation of Example III is for use in low energy printers which print at higher speeds in the range of 6 to 10 inches per second and which require a higher sensitivity transfer media. The higher speed printing operation is accomplished by reducing the amount of adhesive in the formulation and incorporating waxes having lower melting points. In Example III, the formulation includes a combination of Carnauba and Paraffin wax emulsions along with an acrylic carbon black dispersion. The amount of alcohol was reduced to a lower level to provide a more environmentally acceptable coating for the printing system.

An additional formulation for the coating 24 includes the ingredients and quantities as set out in Example IV.

EXAMPLE IV

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 18.0 | 18.0 | 18.0 | 12–40 |
| Polyox (N-10) | 0.1 | 3.0 | 3.0 | 30.0 | 2–8 |
| Turkey Red Oil (Sulphonated Castor Oil) | 0.5 | 4.0 | 4.0 | 8.0 | 2–8 |
| HDPE (ME-46940) | 0.4 | 15.0 | 15.0 | 37.5 | 1–40 |
| #1 Carnauba (ML-160) | 0.25 | 35.0 | 35.0 | 140.0 | 5–75 |
| Candelilla (EE-30825) | 0.25 | 25.0 | 25.0 | 100.0 | 15–75 |
| Subtotal | | 100.0 | 100.0 | 333.5 | |
| N-Propanol or IsoPropanol (10%) | | | | 15.0 | 5–15 |
| De-Ionized Water (90%) | | | | 1.5 | Balance |
| Total | | 100.0 | 100.0 | 400.0 | |
| Wet Batch: 400 | | Design Solids: 25% | | | 15–35 |

Still another formulation for the coating 24 includes the ingredients and quantities as set out in Example V.

EXAMPLE V

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 17.8 | 19.2 | 19.2 | 12–40 |
| Surfactant (Surfynol 104) | 1.0 | 0.2 | 0.2 | 0.2 | .1–1 |
| Polyox (N-10) | 1.0 | 3.0 | 3.2 | 3.2 | 2–8 |
| Gum Arabic (Flaked) | 0.2 | 4.0 | 4.3 | 21.6 | 2–8 |
| HDPE (ME-46940) | 0.4 | 15.0 | 16.2 | 40.5 | 1–40 |
| #1 Filtered Carnauba (ML-164) | 0.25 | 60.0 | 64.8 | 259.2 | 15–75 |
| Subtotal | | 100.0 | 107.9 | 343.9 | |
| N-Propanol or IsoPropanol (10%) | | | | 29.2 | 5–40 |
| Deionized Water (90%) | | | | 26.9 | Balance |
| Total | | 100.0 | 107.9 | 400.0 | |
| Wet Batch: 400 | | Design Solids: 27% | | | 15–35 |

Still a further formulation for the coating 24 includes the ingredients and quantities as set out in Example VI.

EXAMPLE VI

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 29.9 | 32.9 | 32.9 | 12–40 |
| #3 Carnauba (ML-156) | 0.25 | 55.0 | 60.5 | 242.0 | 15–75 |
| HDPE (ME-46940) | 0.4 | 12.0 | 13.2 | 33.0 | 1–40 |
| Polyox (N-10) | 0.1 | 2.0 | 2.2 | 22.0 | 2–8 |
| Blue Dye (HS-1520) | 0.4 | 1.0 | 1.1 | 2.8 | 1–5 |
| Wetting Surfactant (Surfynol 104) | 0.1 | 0.1 | 0.1 | 1.1 | .1–1 |
| Subtotal | | 100.0 | 110.0 | 333.8 | |
| N-Propanol or IsoPropanol (10%) | | | | 18.5 | 5–15 |
| Deionized Water (90%) | | | | 147.7 | Balance |
| Total | | 100.0 | 110.0 | 500.0 | |
| Wet Batch: 500 | | Design Solids: 22% | | | 15–35 |

Still an additional formulation for the coating 24 includes the ingredients and quantities as set out in Example VII.

EXAMPLE VII

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 10.0 | 12.5 | 12.5 | 10–30 |
| HDPE (ME-46940) | 0.4 | 55.0 | 68.6 | 171.9 | 10–60 |
| Candelilla | 0.25 | 15.0 | 18.8 | 75.0 | 15–75 |

-continued

| Component & Commercial Grade | Component Solids (Fraction) | Percent Dry | Batch Dry | Batch Wet | Experimental Range % |
|---|---|---|---|---|---|
| (EE-30825) | | | | | |
| Pigmented Latex (EC-9724) | 0.4 | 15.0 | 18.8 | 46.9 | 10–20 |
| Defoamer Surfactant (Surfynol GA) | 1.0 | 5.0 | 6.3 | 6.3 | 1–5 |
| Subtotal | | 100.0 | 125.0 | 312.6 | |
| N-Propanol or IsoPropanol (10%) | | | | 37.5 | 5–15 |
| Deionized Water (90%) | | | | 149.9 | Balance |
| Total | | 100.0 | 125.0 | 500.0 | |
| Wet Batch: 500 | | Design Solids: 25% | | | 15–35 |

Still another formulation for the coating 24 includes the ingredients and quantities as set out in Example VIII.

EXAMPLE VIII

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 19.9 | 24.8 | 24.8 | 12–40 |
| #3 Carnauba (ML-156) | 0.25 | 48.0 | 60.0 | 240.0 | 15–75 |
| HDPE (ME-46940) | 0.4 | 25.0 | 31.3 | 78.1 | 1–40 |
| Candelilla (EE-30825) | 0.25 | 2.0 | 2.5 | 10.0 | 1–10 |
| Polyester Resin (HR-100) | 0.65 | 5.0 | 6.3 | 9.6 | 1–10 |
| Wetting Surfactant (Surfynol 104) | 0.1 | 0.1 | 0.1 | 1.3 | .1–1 |
| Subtotal | | 100.0 | 125.0 | 363.8 | |
| N-Propanol or IsoPropanol (10%) | | | | 17.6 | 5–15 |
| Deionized Water (90%) | | | | 118.5 | Balance |
| Total | | 100.0 | 125.0 | 500.0 | |
| Wet Batch: 500 | | Design Solids: 25% | | | 15–35 |

Still a further formulation for the coating 24 includes the ingredients and quantities as set out in Example IX.

EXAMPLE IX

| Component & Commercial Grade | Component Solids (Fraction) | Percent Dry | Batch Dry | Batch Wet | Experimental Range % |
|---|---|---|---|---|---|
| Carbon Black (RP-450) | 1.0 | 17.9 | 22.4 | 22.4 | 12–40 |
| Polyox (N-10) | 0.1 | 3.0 | 3.8 | 37.5 | 2–8 |
| HDPE (ME-46940) | 0.4 | 15.0 | 18.8 | 46.9 | 1–40 |
| #3 Carnauba (ML-156) | 0.25 | 60.0 | 75.0 | 300.0 | 15–75 |
| Poly-Ketone Resin (K-1717) | 0.5 | 4.0 | 5.0 | 10.0 | 2–8 |
| Wetting Surfactant (Surfynol 104) | 0.1 | 0.1 | 0.1 | 1.3 | .1–1 |
| Subtotal | 100.0 | 125.1 | 418.1 | | |
| N-Propanol or | | | | 31.4 | 5–15 |

-continued

| Component & Commercial Grade | Component Solids (Fraction) | Percent Dry | Batch Dry | Batch Wet | Experimental Range % |
|---|---|---|---|---|---|
| IsoPropanol (10%) | | | | | |
| Deionized Water (90%) | | | | 50.5 | Balance |
| Total | | 100.0 | 125.1 | 500.0 | |
| Wet Batch: 500 | | Design Solids: 25% | | | 15–35 |

The substrate or base 22, which may be 30–40 gauge capacitor tissue, as manufactured by Glatz, or 18–21 gauge polyester film, as manufactured by duPont under the trademark Mylar, should have a high tensile strength to provide for ease in handling and coating of the substrate. Additionally, the substrate 22 should have properties of minimum thickness and low heat resistance to prolong the life of the heating elements 32 of the thermal print head by reason of reduced print head actuating energies.

The availability of the various ingredients used in the above examples of the present invention is provided by the following list of companies.

| Ingredient | Supplier |
|---|---|
| Carbon Black | Columbian Carbon |
| Acrylic Black | Heubach |
| Polyethylene Oxide Resin | Union Carbide |
| Casein | American Casein |
| High Density Polyethylene | Michelman Inc. |
| Carnauba wax | Michelman Inc. |
| Glycerine | Proctor & Gamble |
| Paraffin wax | Boler |
| Turkey Red Oil | Welch, Holme & Clark |
| Candelilla | Michelman Inc. |
| Gum Arabic | Gumix Int. Inc. |
| Blue Dye | Hilton-Davis |
| Pigmented Latex | Environmental Ink |
| Polyester Resin | Lawter |
| Poly-Ketone Resin | Lawter |
| N-Propanol or IsoPropanol | Ashland Chemical |

Carbon Black is a pigment or colorent that provides a black print or image that is recognized by a bar code reader. Poly(ethylene oxide) resin is a nonionic ethylene oxide homopolymer that is soluble in water and in alcohol and also in a combination thereof. The Polyox resin is truly thermoplastic and completely soluble in water up to its boiling point. Poly(ethylene oxide) resin is developed by a polymerization process utilizing a chain of ethylene oxide molecules. The Polyox resin is a high polymer with the following common structure $(O—CH_2\ CH_2)_n$. The degree of polymerization n varies from about 2,000 to 100,000. Several grades of the poly(ethylene oxide) resin are available ranging in molecular weights from 100,000 to 5,000,000. The Polyox material assists in transfer of the images and reduces any tendency towards brittleness. Casein is a powder that provides better hardening characteristics and resistance to smear. HDPE is a high density polyethylene emulsion that provides good smear resistance. Glycerine is a plasticizer-type material that stays moist and prevents the coating or printed images from becoming brittle. It was found during the experiments that the use of glycerine loses some smear resistance but increases flexibility and transfer characteristics.

The scope of the present invention includes the use of different colors for certain applications where non-black pigments can be substituted in the coating for the ribbon. By way of example, a variety of acrylic color dispersions are available from Heubach in colors which cover the entire color spectrum.

It is also found that non-black colorents, such as Hoover 9964 red iron oxide or EH-50814 Magenta Latex can be substituted in the ribbon coatings to provide red or magenta color ribbons. In order to improve the scanning characteristics of red color thermal transfer ribbons for use with laser or infra red scanners, small amounts of infra red absorbing pigments of extremely fine particle size can be added to the coating. Specific pigments which are suitable for this purpose are Magnet Black S-0045 available from BASF, Bone Black #6 from Hoover, and Gilsonite Brilliant Black from Ziegler.

The above three specific pigments are dull gray in color but their very fine spherical particle size creates substantially transparent coatings in a range up to about 15 percent loading when using one or another of such pigments. It is also found that these pigments do not influence the color of the coating substantially when added to tones of darker colors such as Magenta RS1115 or Blue HS1520 available from Heubach. Latex dispersed pigments such as Magenta EP-50184 or Blue EP-2379 available from Environmental Ink can also be substituted as non-black pigments in the coating of the ribbon.

And, still an additional formulation for the coating 24 is set out in Example X.

EXAMPLE X

| Component & Commercial Grade | Component Solids (Fraction) | Percent Dry | Batch Dry | Batch Wet | Experimental Range % |
|---|---|---|---|---|---|
| Magenta (EH-50814) | 0.4 | 20.0 | 25.0 | 62.5 | 15–30 |
| HDPE (ME-46940) | 0.4 | 20.0 | 25.0 | 62.5 | 10–40 |
| BASF Oxide (S-0045) | 1.0 | 15.0 | 18.8 | 18.8 | 12–18 |
| #3 Carnauba (ML-156) | 0.25 | 35.0 | 43.8 | 175.0 | 25–60 |
| PolyKetone (K-1717) | 0. 33 | 10.0 | 12.5 | 37.9 | 8–15 |
| Subtotal | | 100.0 | 125.0 | 356.6 | |
| N-Propanol (10%) | | | | 12.1 | 5–15 |
| Deionized Water (90%) | | | | 131.3 | Balance |
| Total | | 100.0 | 125.0 | 500.0 | |
| Wet Batch: 500 Grams | | Design Solids: 25% | | | 15–35 |

The Polyketone K-1717 is prepared as a 33% solution in solvent. The Magenta EH-50814 is supplied by Environmental Ink.

It is to be noted that in the development of the water base emulsion technology, hundreds of different coatings have been created. These coatings cover a wide range of compounds and ingredients, however the following summary provides additional scope of the present invention.

In the case of low energy printers, as known in the industry, block polymers of Styrene-Butadiene, such as Kraton 1107 and 1101 made by Stevens, or Polyacrylic rubber such as Rhoplex N-619 made by Rohm and Haas, or Polyurethane emulsions made by MACE Adhesive and Coating, Inc. can be substituted as elastomers to provide the flexibility and adhesion and thereby improve the printing performance in such low energy printers.

Ethylene Oxide polymer such as Polyox N-10 or N-80 made by Union Carbide, Casein BL-380 made by American Casein, Acrylic/Vinyl Acetate copolymers supplied by Rohm and Haas, Polyvinyl Alcohol supplied by Air Reduction, and water soluble cellulosic polymers such as Nitrosol or Methocel provided by Hercules and Carboxy Methyl Cellulose supplied by Union Carbide, all for the purposes of providing toughness and cohesion of the coating, have been evaluated and documented.

A wide variety of resin emulsions of Polyacrylate Esters such as MMA, BMA and EMA supplied by Rohm and Haas, Polyester, Polyamide, Polyethylene, Polypropylene and Silicone emulsions supplied by Michelman, and Phenolic resin dispersions supplied by BASF and Schenectady have been evaluated with the results that such emulsions show an improvement in smear and in scratch resistance.

It is also to be noted that the wax emulsions are the key transfer agents, and include #1 Carnauba, #3 Carnauba, Carnauba-Paraffin, Carnauba-Polyethylene, Rice Bran, Candellila, Ethylene Acrylic Acid, Hystrene 9022, Stearic Acid, Palm Wax and Beeswax supplied by Michelman.

Small amounts of defoamers such as Nopco NDW and Surfynol 104, supplied Nopco Chemical and Airco Chemical, respectively, are incorporated in the dispersion or grinding process to control foam and improve "wetting" of the pigments or dyes.

Additional advantages of the present invention are that disposal of excess materials is not a problem, that excess materials can be saved for reuse, and that the water-based process enables safety at room temperature processing.

It is thus seen that herein shown and described is a thermal transfer ribbon for use in thermal printing operations that includes a water-based coating acceptable for environmental conditions. The single coating or layer includes thermally active or transfer material for imaging onto a receiving sheet. The present invention enables the accomplishment of the objects and advantages mentioned above, and while a preferred embodiment has been disclosed herein, variations thereof may occur to those skilled in the art. It is contemplated that all such variations and any modifications not departing from the spirit and scope of the invention hereof are to be construed in accordance with the following claims.

What is claimed is:

1. A thermal transfer coating formulation, comprising:

carnauba wax and paraffin wax emulsified in a mixture of about 1–10% volatile solvent and about 90–99% water.

2. The thermal transfer coating formulation in accordance with claim 1 wherein said solvent comprises N-propanol.

3. The thermal transfer coating formulation in accordance with claim 1 wherein said solvent comprises IsoPropanol.

4. The thermal transfer coating formulation in accordance with claim 1, wherein said water comprises de-ionized water.

5. The thermal transfer coating formulation in accordance with claim 1, wherein said coating formulation includes 30 to 75 percent of said carnauba wax, and 30 to 75 percent of said paraffin wax.

6. The thermal transfer coating formulation in accordance with claim 5 including about 6 to 30 percent acrylic carbon black.

* * * * *